United States Patent
Lo

(10) Patent No.: US 7,274,752 B2
(45) Date of Patent: *Sep. 25, 2007

(54) MAXIMUM RATIO TRANSMISSION

(75) Inventor: Titus Lo, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 270 days.

This patent is subject to a terminal disclaimer.

(21) Appl. No.: 10/963,838

(22) Filed: Oct. 12, 2004

(65) Prior Publication Data

US 2005/0078769 A1    Apr. 14, 2005

Related U.S. Application Data

(63) Continuation of application No. 10/177,461, filed on Jun. 19, 2002, now Pat. No. 6,826,236, which is a continuation of application No. 09/156,066, filed on Sep. 17, 1998, now Pat. No. 6,459,740.

(51) Int. Cl.
*H04L 27/00* (2006.01)

(52) U.S. Cl. ............... 375/299; 375/267; 375/347

(58) Field of Classification Search ............. 375/299, 375/267, 347, 349; 455/101
See application file for complete search history.

(56) References Cited

U.S. PATENT DOCUMENTS 3,633,107 A    1/1972    Brady (Continued)

FOREIGN PATENT DOCUMENTS

CA    2302289    3/1998

(Continued)

OTHER PUBLICATIONS

Alamouti, S. M., "Trellis-Coded Modulation and Transmit Diversity: Design Criteria and Performance Evaluation," 0-7803-5106-1/98, pp. 703-708, 1998 IEEE.

(Continued)

*Primary Examiner*—Jean B. Corrielus
(74) *Attorney, Agent, or Firm*—Powell Goldstein LLP

(57) ABSTRACT

An arrangement where a transmitter has a plurality of transmitting antennas that concurrently transmit the same symbol, and where the signal delivered to each transmitting antenna is weighted by a factor that is related to the channel transmission coefficients found between the transmitting antenna and receiving antennas. In the case of a plurality of transmit antennas and one receive antenna, where the channel coefficient between the receive antenna and a transmit antenna $i$ is $h_i$, the weighting factor is $h_i^*$ divided by a normalizing factor, $\alpha$, which is $$\left(\sum_{k=1}^{K} |h_k|^2\right)^{1/2},$$

where K is the number of transmitting antennas. When more than one receiving antenna is employed, the weighting factor is $$\frac{1}{\alpha}(gH)^H,$$

where $g=[g_1 \ldots g_L]$, H is a matrix of channel coefficients, and $\alpha$ is a normalizing factor $$\left(\sum_{p=1}^{L}\sum_{q=1}^{L}\left|\sum_{k=1}^{K} h_{pk} h_{qk}^*\right|\right)^{1/2}.$$

12 Claims, 3 Drawing Sheets

U.S. PATENT DOCUMENTS

| | | |
|---|---|---|
| 3,978,408 A | 8/1976 | Gupta et al. |
| 4,001,692 A | 1/1977 | Fenwick |
| 4,099,121 A | 7/1978 | Fang |
| 4,369,516 A | 1/1983 | Byrnes |
| 4,567,464 A | 1/1986 | Siegel |
| 4,577,332 A | 3/1986 | Brenig |
| 4,675,880 A | 6/1987 | Davarian |
| 4,733,402 A | 3/1988 | Monsen |
| 4,763,331 A | 8/1988 | Matsumoto |
| 4,953,183 A | 8/1990 | Bergmans et al. |
| 5,022,053 A | 6/1991 | Chung et al. |
| 5,029,185 A | 7/1991 | Wei |
| 5,088,113 A | 2/1992 | Wei |
| 5,101,501 A | 3/1992 | Gilhousen et al. |
| 5,109,390 A | 4/1992 | Gilhousen et al. |
| 5,170,413 A | 12/1992 | Hess |
| 5,202,903 A | 4/1993 | Okanone |
| 5,283,780 A | 2/1994 | Schuchman et al. |
| 5,305,353 A * | 4/1994 | Weerackody ............... 375/347 |
| 5,319,677 A | 6/1994 | Kim |
| 5,369,412 A * | 11/1994 | Tsujimoto ................... 342/380 |
| 5,396,518 A | 3/1995 | How |
| 5,416,797 A | 5/1995 | Gilhousen |
| 5,418,798 A | 5/1995 | Wei |
| 5,442,627 A | 8/1995 | Viterbi et al. |
| 5,457,712 A * | 10/1995 | Weerackody ............... 375/347 |
| 5,461,646 A | 10/1995 | Anvari |
| 5,461,696 A | 10/1995 | Frank et al. |
| 5,479,448 A | 12/1995 | Seshadri |
| 5,481,572 A | 1/1996 | Skold et al. |
| 5,499,272 A | 3/1996 | Bottomley |
| 5,553,102 A | 9/1996 | Jasper et al. |
| 5,613,219 A | 3/1997 | Vogel et al. |
| 5,675,590 A | 10/1997 | Alamouti et al. |
| 5,781,845 A * | 7/1998 | Dybdal et al. ................. 455/65 |
| 5,787,131 A * | 7/1998 | Bottomley ................... 375/347 |
| 5,790,570 A | 8/1998 | Heegard et al. |
| 5,819,168 A * | 10/1998 | Golden et al. ............... 455/303 |
| 5,838,742 A * | 11/1998 | Abu-Dayya ................. 375/347 |
| 5,848,103 A | 12/1998 | Weerackody |
| 5,859,870 A | 1/1999 | Tsujimoto |
| 5,924,034 A | 7/1999 | Dupuy |
| 5,933,421 A | 8/1999 | Alamouti et al. |
| 5,943,372 A | 8/1999 | Gans et al. |
| 5,949,833 A | 9/1999 | Weerackody |
| 5,960,039 A | 9/1999 | Martin et al. |
| 5,991,273 A * | 11/1999 | Abu-Dayya ................. 370/252 |
| 5,991,331 A | 11/1999 | Chennakeshu et al. |
| 5,999,826 A * | 12/1999 | Whinnett ..................... 455/561 |
| 6,031,474 A | 2/2000 | Kay et al. |
| 6,034,987 A | 3/2000 | Chennakashu et al. |
| 6,038,263 A | 3/2000 | Kotzin et al. |
| 6,038,272 A * | 3/2000 | Golden et al. ............... 375/347 |
| 6,044,120 A * | 3/2000 | Bar-David et al. .......... 375/347 |
| 6,067,324 A * | 5/2000 | Harrison ..................... 375/267 |
| 6,088,408 A | 7/2000 | Calderbank et al. |
| 6,094,465 A | 7/2000 | Stein |
| 6,097,771 A | 8/2000 | Foschini |
| 6,101,399 A * | 8/2000 | Raleigh et al. .............. 455/561 |
| 6,115,427 A | 9/2000 | Calderbank |
| 6,144,711 A * | 11/2000 | Raleigh et al. .............. 375/347 |
| 6,144,771 A | 11/2000 | Li et al. |
| 6,154,485 A | 11/2000 | Harrison |
| 6,173,005 B1 | 1/2001 | Kotzin |
| 6,178,196 B1 | 1/2001 | Naguib et al. |
| 6,185,258 B1 | 2/2001 | Alamouti et al. |
| 6,185,266 B1 | 2/2001 | Kuchi et al. |
| 6,188,736 B1 | 2/2001 | Lo et al. |
| 6,192,256 B1 * | 2/2001 | Whinnett ................. 455/562.1 |
| 6,298,082 B1 | 10/2001 | Harrison |
| 6,304,581 B1 | 10/2001 | Chen et al. |
| 6,317,411 B1 | 11/2001 | Whinnett et al. |
| 6,317,466 B1 | 11/2001 | Foschini et al. |
| 6,327,299 B1 | 12/2001 | Meszko |
| 6,377,631 B1 | 4/2002 | Raleigh |
| 6,393,074 B1 | 5/2002 | Mandyam et al. |
| 6,411,257 B1 * | 6/2002 | Sorelius et al. .............. 342/378 |
| 6,411,612 B1 * | 6/2002 | Halford et al. .............. 370/347 |
| 6,430,231 B1 | 8/2002 | Calderbank et al. |
| 6,452,981 B1 | 9/2002 | Raleigh et al. |
| 6,470,043 B1 | 10/2002 | Lo et al. |
| 6,501,803 B1 | 12/2002 | Alamouti et al. |
| 6,542,556 B1 | 4/2003 | Kuchi et al. |
| 6,549,585 B2 | 4/2003 | Naguib et al. |
| 6,728,307 B1 * | 4/2004 | Derryberry et al. ......... 375/219 |
| 6,741,635 B2 | 5/2004 | Lo et al. |
| 6,775,329 B2 | 8/2004 | Alamouti et al. |
| 6,807,240 B2 | 10/2004 | Alamouti et al. |
| 6,853,688 B2 | 2/2005 | Alamouti et al. |
| 7,145,971 B2 * | 12/2006 | Raleigh et al. .............. 375/347 |
| 2004/0157646 A1 * | 8/2004 | Raleigh et al. ........... 455/562.1 |
| 2005/0157810 A1 | 7/2005 | Raleigh et al. |
| 2005/0195915 A1 * | 9/2005 | Raleigh et al. .............. 375/267 |

FOREIGN PATENT DOCUMENTS

| | | |
|---|---|---|
| CA | 2276207 | 5/1999 |
| DE | 29824760 | 6/2002 |
| DE | 29824761 | 6/2002 |
| DE | 29824762 | 6/2002 |
| DE | 29824763 | 6/2002 |
| DE | 29824765 | 6/2002 |
| EP | 0767546 | 4/1997 |
| EP | 1016228 | 7/2000 |
| GB | 2237706 | 5/1991 |
| GB | 2280575 | 1/1995 |
| GB | 2290010 | 12/1995 |
| GB | 2311445 | 9/1997 |
| JP | 63-286027 | 11/1988 |
| WO | 91/20142 | 12/1991 |
| WO | 95/22214 | 8/1995 |
| WO | 97/24849 | 7/1997 |
| WO | 98/09385 | 3/1998 |
| WO | 99/23766 | 5/1999 |
| WO | 00/11806 | 3/2000 |
| WO | 00/18056 | 3/2000 |
| WO | 00/49780 | 8/2000 |
| WO | 00/51265 | 8/2000 |
| WO | 01/19013 | 3/2001 |
| WO | 01/54305 | 7/2001 |
| WO | 01/56218 | 8/2001 |
| WO | 01/63826 | 8/2001 |
| WO | 01/69814 | 9/2001 |

OTHER PUBLICATIONS

Alamouti, Siavash M., "A Simple Transmit Diversity Technique for Wireless Communications," IEEE Journal on Select Areas in Communications, Oct. 1998, pp. 1451-1458, vol. 16, No. 8, The Institute of Electrical and Electronics Engineers, Inc., New York, NY.

Blanco, M.A. & Zdunek, K., "Performance and Optimization of Switched Diversity Systems for the Detection of Signals with Rayleigh Fading," IEEE Transactions on Communications, 27(12):1887-1895, (Dec. 1979).

Blanco, M.A. & Zdunek, K., "On the Optimization of Simple Switched Diversity Receivers," 1978 IEEE Conference on Communications and Power, Montreal, Canada, pp. 114-117, (1978).

Calderbank, A. et al., "Space-Time Codes for Wireless Communication," 1997 IEEE, ISIT 1997, Jun. 29-Jul. 4, pp. 146, Ulm, Germany.

Cavers, James K., "An Analysis of Pilot Symbol Assisted Modulation for Rayleigh Fading Channels," IEEE Transactions on Vehicular Technology, Nov. 1991, pp. 686-693, vol. 40, No. 4, The Institute of Electrical and Electronics Engineers, Inc., New York, NY.

Foschini, G.J. and Gans, M.J., "On Limits of Wireless Communications in a Fading Environment when Using Multiple Antennas," Wireless Personal Communications 6:311-335, (1998).

Foschini, G.J., "Layered Space-Time Architecture for Wireless Communication in a Fading Environment when Using Multi-Element Antennas", Bell Technical Labs Journal, pp. 41-59.

Hinderling, J. et al., "CDMA Mobile Station Modem ASIC," IEEE 1992 Custom Integrated Circuits Conference pp. 10.2.1-10.2.5, (1992).

Hiroike, A. et al., "Combined Effects of Phase Sweeping Transmitter Diversity and Channel Coding," IEEE Transactions on Vehicular Technology, vol. 41, No. 2, May 1992, The Institute of Electrical and Electronics Engineers, Inc., New York, NY.

Kerr, R. et al., "The CDMA Digital Cellular System: An ASIC Overview," IEEE 1992 Custom Integrated Circuits Conference pp. 10.1.1-10.1.7, (1992).

Naguib, A. F. et al., "Space-Time Coded Modulation for High Data Rate Wireless Communications," 1997 EEE, pp. 102-109, 0-7803-4198-8/97, The Institute of Electrical and Electronics Engineers, Inc., New York, NY.

Naguib, Ayman et al., "A Space-Time Coding Modem for High-Data-Rate Wireless Communications," IEEE Journal On Selected Areas in Communications, Oct. 1998, pp. 1459-1478, The Institute of Electrical and Electronics Engineers, Inc., New York, NY.

Pickholtz, R.L. et al., "Theory of Spread Spectrum Communications-A Tutorial," IEEE Transactions on Communications, 30(5):855-884, (1982).

Sampei, Seiichi et al., "Rayleigh Fading Compensation Method for 16QAM in Digital Land Mobile Radio Channels," Proceeding of the 1989 IEEE Vehicular Technology Conference, May 1989, pp. 640-646, The Institute of Electrical and Electronics Engineers, Inc., New York, NY.

Seshadri, N. et al., "Advanced Techniques for Modulation, Error Correction, Channel Equalization and Diversity," AT&T Tech. Journal 47(4): 48-63, Jul. 1993.

Seshadri, N. et al., "Space-Time Codes for Wireless Communication: Code Construction," IEEE 47th Vehicular Technology Cont., Phoenix, pp. 637-641, May 1997.

Seshadri, N. et al., "Two Signaling Schemes for Improving the Error Performance of FDD Transmission Systems Using Transmitter Antenna Diversity," Proceeding of the 1993 IEEE Vehicular Technology Conference (VTC 43rd), May 1993, pp. 508-511, The Institute of Electrical and Electronics Engineers, Inc., New York, NY.

Tarokh, V. et al., "Space Time Codes for High Data Rate Wireless Communication: Performance Criteria in the Presence of Channel Estimation Errors, Mobility, and Multiple Paths", IEEE Transactions on Communications 47 (2):199-207, (1999).

Tarokh, V., et al., "Space-Time Codes for High Data Rate Wireless Communication: Performance Criteria," IEEE International Conference on Communications, Montreal, 1:299-303, Jun. 1997.

Tarokh, Vahid et al., "Combined Array Processing and Space-Time Coding," IEEE Transactions on Information Theory, May 1999, pp. 1121-1128, vol. 45, No. 4, The Institute of Electrical and Electronics Engineers, Inc., New York, NY.

Tarokh, Vahid et al., "Space-Time Codes for High Data Rate Wireless Communication: Performance Criterion and Code Construction," IEEE Transactions on Information Theory, Mar. 1998, pp. 744-765, vol. 44, No. 2, The Institute of Electrical and Electronics Engineers, Inc., New York, NY.

Ungerboeck, Gottfried, "Channel Coding with Multilevel/Phase Signals," IEEE Transactions on Information Theory, Jan. 1982, pp. 55-67, vol. IT-28, No. 1, The Institute of Electrical and Electronics Engineers, Inc., New York, NY.

Weerackody, V., "Diversity for the Direct-Sequence Spread Spectrum System Using Multiple Transmit Antennas," Proceedings of the IEEE International conference on Communications, May 23-26, 1993, Geneva, vol. 3, pp. 1775-1779.

Winters, J.H., "The Diversity Gain of Transmit Diversity in Wireless Systems with Rayleigh Fading," 1998 IEEE, pp. 119-123.

Winters, J.H., Salz, J., Gitlin, R.D., "The Impact of Antenna Diversity on the Capacity of Wireless Communications Systems," IEEE Transactions on Communications, vol. 42, No. 2, Feb./Mar./Apr. 1994, pp. 1740-1751, IEEE Communications Society, New York, NY.

Wittneben, A., "A New Bandwidth Efficient Transmit Antenna Modulation Diversity Scheme For Linear Digital Modulation," Proceeding of the 1993 IEEE International Conference on Communications (IICC '93), May 1993, pp. 1630-1634, The Institute of Electrical and Electronics Engineers, Inc., New York, NY.

Wittneben, A., "Basestation modulation diversity for digital SIMULCAST," Proceeding of the 1991 IEEE Vehicular Technology Conference, May 1991, pp. 848-853, The Institute of Electrical and Electronics Engineers, Inc., New York, NY.

* cited by examiner

MAXIMUM RATIO TRANSMISSION

CROSS REFERENCE TO RELATED APPLICATIONS

This application is a continuation of U.S. patent application Ser. No. 10/177,461, filed on Jun. 19, 2002, now U.S. Pat. No. 6,826,236, which is a continuation of U.S. patent application Ser. No. 09/156,066 filed on Sep. 17, 1998, now U.S. Pat. No. 6,459,740, both of which are incorporated herein by reference in their entirety.

BACKGROUND OF THE INVENTION

Wireless communications services are provided in different forms. For example, in satellite mobile communications, communications links are provided by satellite to mobile users. In land mobile communications, communications channels are provided by base stations to the mobile users. In PCS, communications are carried out in microcell or picocell environments, including outdoors and indoors. Regardless the forms they are in, wireless telecommunication services are provided through radio links, where information such as voice and data is transmitted via modulated electromagnetic waves. That is, regardless of their forms, all wireless communications services are subjected to vagaries of the propagation environments.

The most adverse propagation effect from which wireless communications systems suffer is the multipath fading. Multipath fading, which is usually caused by the destructive superposition of multipath signals reflected from various types of objects in the propagation environments, creates errors in digital transmission. One of the common methods used by wireless communications engineers to combat multipath fading is the antenna diversity technique, where two or more antennas at the receiver and/or transmitter are so separated in space or polarization that their fading envelopes are de-correlated. If the probability of the signal at one antenna being below a certain level is p (the outage probability), then the probability of the signals from L identical antennas all being below that level is $p^L$. Thus, since p<1, combining the signals from several antennas reduces the outage probability of the system. The essential condition for antenna diversity schemes to be effective is that sufficient de-correlation of the fading envelopes be attained.

A classical combining technique is the maximum-ratio combining (MRC) where the signals from received antenna elements are weighted such that the signal-to-noise ratio (SNR) of the their sum is maximized. The MRC technique has been shown to be optimum if diversity branch signals are mutually uncorrelated and follow a Rayleigh distribution. However, the MRC technique has so far been used exclusively for receiving applications. As there are more and more emerging wireless services, more and more applications may require diversity at the transmitter or at both transmitter and receiver to combat severe fading effects. As a result, the interest in transmit diversity has gradually been intensified. Various transmit diversity techniques have been proposed but these transmit diversity techniques were built on objectives other than to maximize the SNR. Consequently, they are sub-optimum in terms of SNR performance.

SUMMARY

Improved performance is achieved with an arrangement where the transmitter has a plurality of transmitting antennas that concurrently transmit the same symbol, and where the signal delivered to each transmitting antenna is weighted by a factor that is related to the channel transmission coefficients found between the transmitting antenna and receiving antenna(s). In the case of a plurality of transmit antennas and one receive antenna, where the channel coefficient between the receive antenna and a transmit antenna i is $h_i$, the weighting factor is $h_i^*$ divided by a normalizing factor, a, which is $$\left(\sum_{k=1}^{K} |h_k|^2\right)^{1/2},$$

where K is the number of transmitting antennas. When more than one receiving antenna is employed, the weighting factor is $$\frac{1}{a}(gH)^H,$$

where $g=[g_1 \ldots g_L]$, H is a matrix of channel coefficients, and $\alpha$ is a normalizing factor $$\left(\sum_{p=1}^{L}\sum_{q=1}^{L}\left|\sum_{k=1}^{K} h_{pk} h_{qk}^*\right|\right)^{1/2}.$$

DETAILED DESCRIPTION

Figure 1:
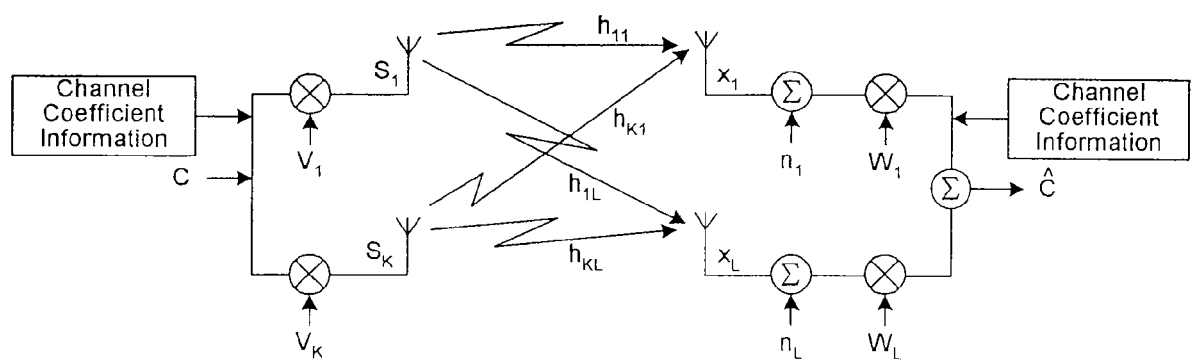
FIG. 1 illustrates an arrangement where there is both transmit and receive diversity.

FIG. 1 depicts a system which comprises K antennas for transmission and L antennas for reception. The channel between the transmit antennas and the receive antennas can be modeled by K×L statistically independent coefficients, as shown in FIG. 1. It can conveniently be represented in matrix notation by $$H = \begin{bmatrix} h_{11} & \cdots & h_{1K} \\ \vdots & \ddots & \vdots \\ h_{L1} & \cdots & h_{LK} \end{bmatrix} = \begin{bmatrix} h_1 \\ \vdots \\ h_L \end{bmatrix} \qquad (1)$$

where the entry $h_{pk}$ represents the coefficient for the channel between transmit antenna k and receiver antenna p. It is assumed that the channel coefficients are available to both the transmitter and receiver through some means, such as through a training session that employs pilot signals sent individually through each transmitting antenna (see block 202 of FIG. 2 and block 302 of FIG. 3). Since obtaining these coefficients is well known and does not form a part of this invention, additional exposition of the process of obtaining the coefficients is deemed not necessary.

Figure 2:
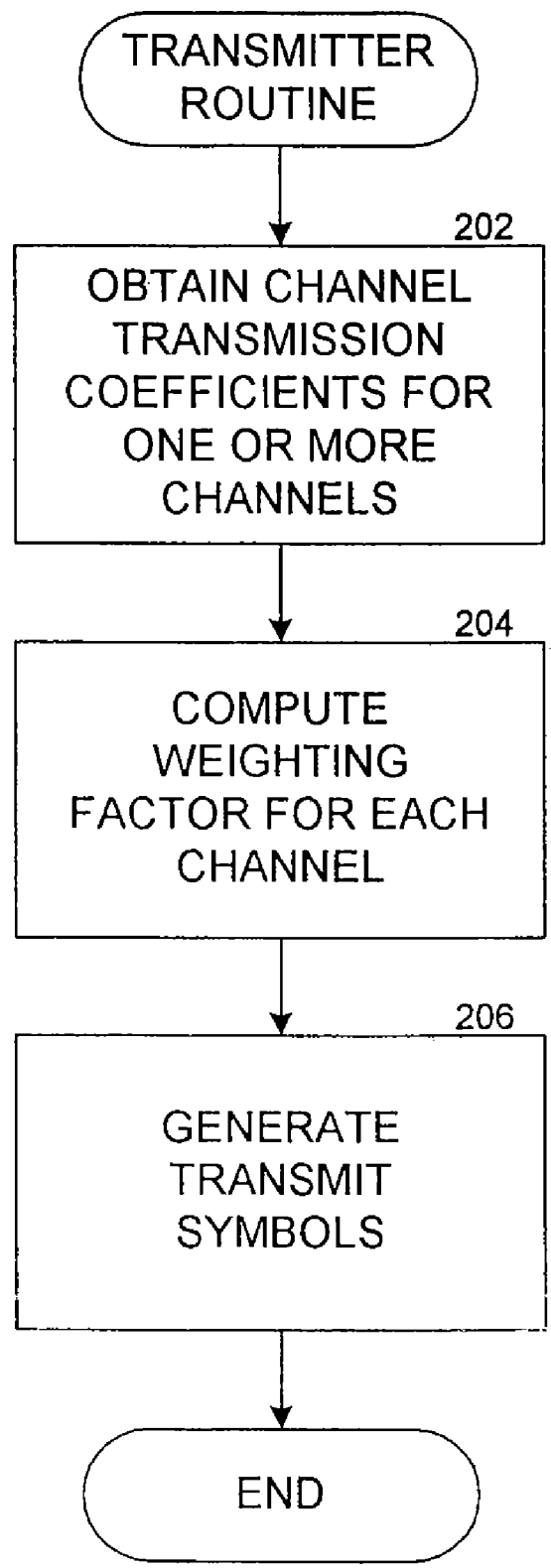
FIG. 2 is a flowchart illustrating a routine performed at the transmitter of FIG. 1.
Figure 3:
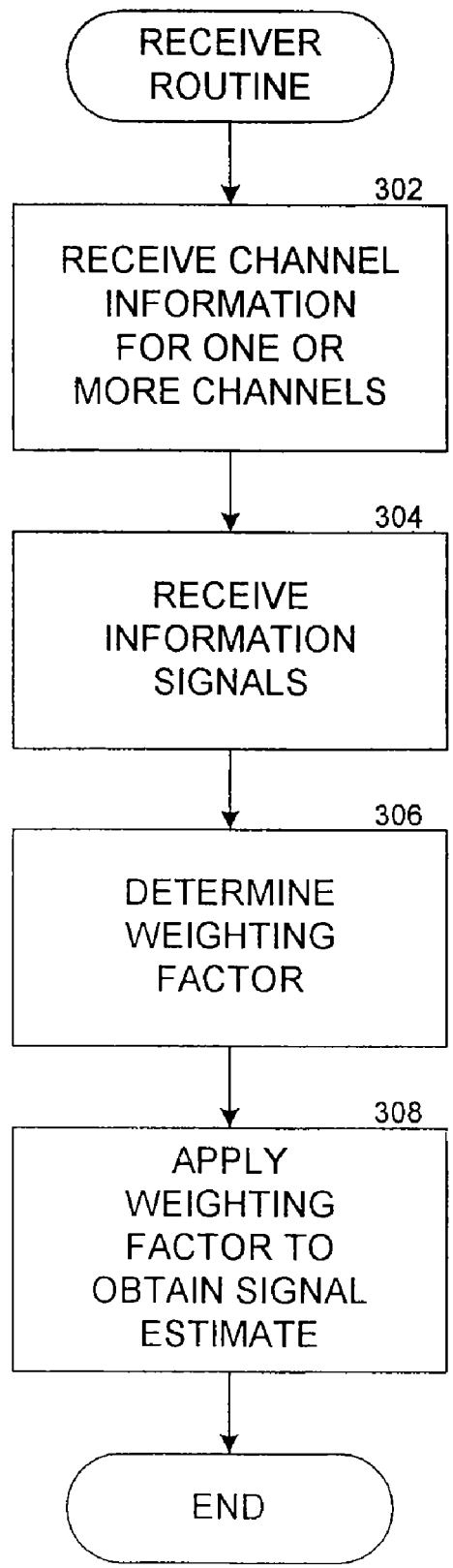
FIG. 3 is a flowchart illustrating a routine performed at the receiver of FIG. 1.

The system model shown in FIG. 1, and also in the routines of FIG. 2 and FIG. 3, is a simple baseband representation. The symbol c to be transmitted is weighted with a transmit weighting vector v to form the transmitted signal vector. The received signal vector, x, is the product of the transmitted signal vector and the channel plus the noise. That is, $$x = Hs + n \quad (2)$$

where the transmitted signals s is given by $$s = [s_1 \ldots s_k]^T = c[v_1 \ldots v_k]^T, \quad (3)$$

the channel is represented by $$H = [h_1 \ldots h_k], \quad (4)$$

and the noise signal is expressed as $$n = [n_1 \ldots n_k]^T. \quad (5)$$

The received signals are weighted and summed to produce an estimate, $\hat{c}$, of the transmitted symbol c.

In accordance with the principles of this invention and as illustrated in block 204 of FIG. 2, the transmit weighting factor, v, is set to $$v = \frac{1}{a}[h_1 \cdots h_K]^H \quad (6)$$

where the superscript H designates the Hermitian operator, and a is a normalization factor given by $$a = \left( \sum_{k=1}^{K} |h_k|^2 \right)^{1/2} \quad (7)$$

is included in the denominator when it is desired to insure that the transmitter outputs the same amount of power regardless of the number of transmitting antennas. Thus, the transmitted signal vector (block 206 of FIG. 2) is $$s = cv = \frac{c}{a}[h_1 \cdots h_K]^H \quad (8)$$

and the signal received at one antenna is $$x = Hs + n = ac + n, \quad (9)$$

from which the symbol can be estimated with the SNR of $$\gamma = a^2 \frac{\sigma_c^2}{\sigma_n^2} = a^2 \gamma_0 \quad (10)$$

where $\gamma_0$ denotes the average SNR for the case of a single transmitting antenna (i.e., without diversity). Thus, the gain in the instantaneous SNR is $a^2$ when using multiple transmitting antennas rather than a single transmitting antenna.

The expected value of $\gamma$ is $$\bar{\gamma} = E[a^2]\gamma_0 = KE[|h_k|^2]\gamma_0 \quad (11)$$

and, hence, the SNR with a $K^{th}$-order transmitting diversity is exactly the same as that with a $K^{th}$-order receiving diversity.

When more than one receiving antenna is employed, the weighting factor, v, is $$v = \frac{1}{a}(gH)^H \quad (12)$$

where $g = [g_1 \ldots g_L]$ (see block 204 of FIG. 2). The transmitted signal vector is then expressed as $$s = \frac{c}{a}(gh)^H. \quad (13)$$

The normalization factor, $\alpha$, is $|gH|$, which yields $$a = \left( \sum_{p=1}^{L} \sum_{q=1}^{L} g_p g_q^* \sum_{k=1}^{K} h_{pk} h_{qk}^* \right)^{1/2} \quad (14)$$

The received signal vector (block 304 of FIG. 3), is therefore, given by $$x = \frac{c}{a} H(gH)^H + n. \quad (15)$$

When the receiver's weighting factor, w, is set to be g (see blocks 306 and 308 of FIG. 3), the estimate of the received symbol is given by $$\tilde{c} = gx = \frac{c}{a} gH(gh)^H + gn = ac + gn \quad (16)$$

with the overall SNR given by $$\gamma = \frac{a^2}{gg^H} \gamma_0 = \frac{a^2 \gamma_0}{\sum_{p=1}^{L} |g_p|^2}. \quad (17)$$

From equation (17), it can be observed that the overall SNR is a function of g. Thus, it is possible to maximize the SNR by choosing the appropriate values for g. Since the $h_{qk}$ terms are assumed to be statistically identical, the condition that $|g_1| = |g_2| = \ldots = |g_L|$ has to be satisfied for the maximum value of SNR. Without changing the nature of the problem, one can set $|g_p| = 1$ for simplicity. Therefore the overall SNR is $$\gamma = \frac{a^2}{L} \gamma_0 \quad (18)$$

To maximize γ is equivalent to maximizing a, which is maximized if $$(g_p g_q^*) = \frac{\sum_{k=1}^{K} h_{pk} h_{qk}^*}{\left|\sum_{k=1}^{K} h_{pk} h_{qk}^*\right|}. \quad (19)$$

Therefore, $$a = \left(\sum_{p=1}^{L} \sum_{q=1}^{L} \left|\sum_{k=1}^{K} h_{pk} h_{qk}^*\right|\right)^{1/2} \quad (20)$$

which results in the maximum value of γ. It is clear that the gain in SNR is $$\frac{a^2}{L}$$

when multiple transmitting and receiving antennas are used, as compared to using a single antenna on the transmitting side, or the receiving side.

The vector g is determined (block 306 of FIG. 3) by solving the simultaneous equations represented by the equation (19). For example, if L=3, equation (19) embodies the following three equations:

$$(g_1 g_2^*) = \frac{\sum_{k=1}^{K} h_{1k} h_{2k}^*}{\left|\sum_{k=1}^{K} h_{1k} h_{2k}^*\right|}, (g_1 g_3^*) = \frac{\sum_{k=1}^{K} h_{1k} h_{3k}^*}{\left|\sum_{k=1}^{K} h_{1k} h_{3k}^*\right|}, \text{ and} \quad (21)$$

$$(g_2 g_3^*) = \frac{\sum_{k=1}^{K} h_{2k} h_{3k}^*}{\left|\sum_{k=1}^{K} h_{2k} h_{3k}^*\right|}.$$

All of the $h_{pg}$ coefficients are known, so the three equations form a set of three equations and three unknowns, allowing a simple derivation of the $g_1$, $g_2$, and $g_3$ coefficients. The corresponding average SNR is given by $$\bar{\gamma} = E[a^2] \frac{\gamma_0}{L} \quad (22)$$

where the value of $E[a^2]$ depends on the channel characteristics and, in general, is bounded by $$LKE[|h_k|^2] \leq E[a^2] \leq \beta L^2 KE[|h_k|^2].$$

I claim:

1. A wireless communication system for transmitting a signal to a receiver, the system comprising:
   means for multiplying two or more symbols, to be transmitted, by a distinct weighting factor; and
   means, coupled to the means for multiplying, for transmitting the two or more multiplied symbols over two or more separate channels from the system for transmitting to the receiver; and
   wherein each weighting factor is proportional to a complex conjugate of a particular one channel transfer coefficient for one of the two or more channels between the system for transmitting to the receiver.

2. The wireless communication system of claim 1 wherein the weighting factor is divided by a normalizing factor, and wherein the normalizing factor depends in part upon a number of transmitting antennas.

3. The wireless communication system of claim 1 wherein the receiver includes two or more antennas, and the weighting factor is a linear transformation of a channel condition between each one of two or more transmitting antennas and one of the two or more receiving antennas of the receiver.

4. The wireless communication system of claim 1, wherein the weighting factor is a vector according to the equation $$v = \frac{1}{a}[h_1 ... h]^H,$$

wherein $$a = \left(\sum_{k=1}^{K} |h_k|^2\right)^{\frac{1}{2}}; \text{ and}$$

wherein each of $h_1 \ldots h_k$ represents the particular one channel transfer coefficient for one of two or more channels between the system for transmitting to the receiver and H is a Hermitian operator.

5. A wireless communication method for a transmitter to a receiver, the method comprising:
   multiplying two or more symbols, to be transmitted, by a distinct weighting factor; and
   transmitting the two or more multiplied symbols over two or more separate channels from the transmitter to the receiver; and
   wherein each weighting factor is proportional to a complex conjugate of a particular one channel transfer coefficient for one of the two or more channels between the transmitter to the receiver.

6. The method of claim 5 wherein the weighting factor is divided by a normalizing factor, and wherein the normalizing factor depends in part upon a number of transmitting antennas.

7. The method of claim 5 wherein the transmitter and the receiver each include two or more antennas, and the weighting factor is a linear transformation of a channel condition between each one of two or more transmitting antennas and one of the two or more receiving antennas.

8. The method of claim 5, wherein the weighting factor is a vector according to the equation $$v = \frac{1}{a}[h_1 ... h_K]^H,$$

wherein $$a = \left(\sum_{k=1}^{K} |h_k|^2\right)^{\frac{1}{2}}; \text{ and}$$

wherein each of $h_1 \ldots h_k$ represents the particular one channel transfer coefficient for one of the two or more channels between the transmitter to the receiver and H is a Hermitian operator.

9. In a closed loop system for wireless communication, the system comprising in part a transmitter apparatus and a receiver apparatus, a method of receiving a wirelessly transmitted signal, the method comprising:

receiving a signal at one or more receiver antennas;

multiplying the received signal using one or more multipliers, wherein for each one of the receiver antennas, the multiplying includes multiplying a received signal by multiple weighting factors; and wherein the weighting factors are vectors associated with multiple channel transfer coefficients, wherein each channel transfer coefficient is associated with one of multiple transmit antennas and each of the one or more receiver antennas, and wherein each vector also represents a correlation vector between multiple channels associated with the one or more channel transfer coefficients.

10. The method of claim 9 wherein the weighting factors are divided by a normalizing factor, and wherein the normalizing factor depends in part upon a number of transmitting antennas.

11. The method of claim 9 wherein the weighting factors are complex conjugates of corresponding channel coefficients.

12. The method according to claim 9, wherein the weighting factor is a vector determined according to the equation $$v = \frac{1}{a}[h_1 \ldots h_K]^H,$$

wherein $$a = \left(\sum_{k=1}^{K} |h_k|^2\right)^{\frac{1}{2}}; \text{ and}$$

wherein each of $h_1 \ldots h_k$ represents the particular one channel transfer coefficient for one of the two or more channels between the transmitter to the receiver and H is a Hermitian operator.

* * * * *